(12) United States Patent
Grisar (10) Patent No.: US 10,570,739 B2
(45) Date of Patent: Feb. 25, 2020

(54) CIRCLE ELLIPSE ENGINE

(71) Applicant: Robert A Grisar, Ruskin, FL (US)

(72) Inventor: Robert A Grisar, Ruskin, FL (US)

( * ) Notice: Subject to any disclaimer, the term of this patent is extended or adjusted under 35 U.S.C. 154(b) by 0 days.

(21) Appl. No.: 15/613,237

(22) Filed: Jun. 4, 2017

(65) Prior Publication Data

US 2018/0347363 A1 Dec. 6, 2018

(51) Int. Cl.
| | |
|---|---|
| *F01C 21/08* | (2006.01) |
| *F02B 55/10* | (2006.01) |
| *F02B 55/04* | (2006.01) |
| *F02B 55/14* | (2006.01) |
| *F02B 55/16* | (2006.01) |
| *F02B 53/10* | (2006.01) |
| *F01C 1/344* | (2006.01) |
| *F01C 21/04* | (2006.01) |
| *F01C 21/06* | (2006.01) |
| *F01C 21/10* | (2006.01) |
| *F01M 11/02* | (2006.01) |
| *F01M 11/00* | (2006.01) |

(52) U.S. Cl.
CPC ........ *F01C 21/0836* (2013.01); *F01C 1/3446* (2013.01); *F01M 11/0004* (2013.01); *F01M 11/02* (2013.01); *F02B 55/04* (2013.01); *F02B 55/10* (2013.01); *F01C 21/04* (2013.01); *F01C 21/06* (2013.01); *F01C 21/106* (2013.01); *F01C 21/108* (2013.01); *F02B 53/10* (2013.01); *F02B 55/14* (2013.01); *F02B 55/16* (2013.01)

(58) Field of Classification Search
CPC .............. F01C 21/0836; F01C 21/0809; F01C 1/3446; F01C 1/3448; F01M 11/02; F02B 53/00; F02B 53/04; F02B 53/10; F02B 55/04; F02B 55/10; F02B 55/14; F02B 55/16
USPC ........ 123/205, 229, 241, 243; 418/124, 173, 418/217, 219, 231–232, 261, 264
See application file for complete search history.

(56) References Cited

U.S. PATENT DOCUMENTS

| | | | | |
|---|---|---|---|---|
| 1,527,685 A | * | 2/1925 | Huwiler ................ | F04C 2/3446 418/261 |
| 1,686,767 A | * | 10/1928 | Saxon .................... | F02B 53/00 123/243 |
| 2,345,561 A | * | 4/1944 | Allen, Jr. .............. | F01C 1/3446 418/264 |

(Continued)

FOREIGN PATENT DOCUMENTS

| | | | | |
|---|---|---|---|---|
| EP | 0548416 A1 | * | 6/1993 | ............ F01C 1/3448 |
| EP | 1617040 A2 | * | 1/2006 | ............ F01C 1/3448 |

(Continued)

*Primary Examiner* — Thai Ba Trieu (57) ABSTRACT

A circle-ellipse engine includes a stationary circular outer housing having a fixed elliptical inner cam surface, and a separate internal round rotor partitioned into equal segments that are populated by identical movable radial vanes. During rotation, the end of the vanes are positioned a precise, constant distance from the elliptical inner cam surface of the housing. During rotation, a variable height cavity is created representing the difference between the major and minor axes of the elliptical inner cam surface and the rotor face. During each rotation, aspirated air is continuously drawn into combustion chambers, compressed, mixed with fuel, ignited, and exhaust gas products are expelled.

3 Claims, 9 Drawing Sheets

(56) References Cited

U.S. PATENT DOCUMENTS

| | | | | | |
|---|---|---|---|---|---|
| 2,590,729 | A | * | 3/1952 | Scognamillo | F04C 18/352 418/173 |
| 2,988,065 | A | * | 6/1961 | Wankel | F02B 53/04 123/242 |
| 3,468,260 | A | * | 9/1969 | Belden | F04C 2/3448 418/152 |
| 3,551,080 | A | * | 12/1970 | Feller | F01C 19/02 418/124 |
| 3,769,945 | A | * | 11/1973 | Kahre | F01C 1/3568 418/217 |
| 3,799,710 | A | * | 3/1974 | Jacobs | F01C 1/3448 418/147 |
| 3,865,521 | A | * | 2/1975 | Upchurch | F01C 19/08 418/121 |
| 3,873,253 | A | * | 3/1975 | Eickmann | F01C 21/0809 418/261 |
| 4,004,556 | A | * | 1/1977 | Pfeiffer | F02B 53/00 123/243 |
| 4,028,028 | A | * | 6/1977 | Fuchs, Jr. | F01C 1/3448 418/219 |
| 4,325,394 | A | * | 4/1982 | Reams | G03F 7/30 134/141 |
| 4,401,070 | A | * | 8/1983 | McCann | F01C 1/3448 123/229 |
| 4,474,105 | A | * | 10/1984 | Eicher | F15B 15/12 92/122 |
| 4,573,892 | A | * | 3/1986 | DuFrene | B62D 13/00 418/219 |
| 4,575,324 | A | * | 3/1986 | Sommer | F01C 21/0809 418/217 |
| 4,667,468 | A | * | 5/1987 | Hansen | F01C 1/3441 123/248 |
| 4,799,867 | A | * | 1/1989 | Sakamaki | F01C 21/0836 418/1 |
| 5,429,084 | A | * | 7/1995 | Cherry | F01C 1/3448 123/243 |
| 5,509,793 | A | * | 4/1996 | Cherry | F01C 1/3448 123/243 |
| 5,524,587 | A | * | 6/1996 | Mallen | F01C 1/3446 123/202 |
| 5,551,853 | A | * | 9/1996 | Cherry | F01C 1/3448 418/137 |
| 5,634,783 | A | * | 6/1997 | Beal | F01C 21/0836 418/264 |
| 6,776,136 | B1 | * | 8/2004 | Kazempour | F01C 1/3446 123/243 |
| 7,707,987 | B2 | * | 5/2010 | Guthrie | F01C 1/3446 123/243 |
| 7,896,630 | B2 | * | 3/2011 | Grisar | F01C 1/3448 418/261 |

FOREIGN PATENT DOCUMENTS

| | | | | | |
|---|---|---|---|---|---|
| GB | 1110162 | A | * | 4/1968 | F01C 19/10 |
| GB | 1430196 | A | * | 3/1976 | F15B 15/103 |
| GB | 2419382 | A | * | 4/2006 | F01C 1/3441 |
| JP | 55098689 | A | * | 7/1980 | F01C 21/0081 |
| JP | 02019601 | A | * | 1/1990 | |
| WO | WO-8503736 | A1 | * | 8/1985 | F01C 21/0881 |
| WO | WO-0133082 | A1 | * | 5/2001 | F01C 1/3446 |
| WO | WO-2006018848 | A2 | * | 2/2006 | F01C 1/3441 |

* cited by examiner

CIRCLE ELLIPSE ENGINE

CROSS-REFERENCE TO RELATED APPLICATIONS

Current U.S. Class: 418/219; 418/145; 418/153; 418/261; 277/562; 277/566

Current International Class: F04C 18/00 (2006.01); F04C 2/00 (2006.01)

Field of Classification Search: 418/145-148; 418/153; 219; 265; 261; 277/551; 553; 562; 277/566; 568; 572; 581; 589

REFERENCES CITED

U.S. PATENT DOCUMENTS:

| Number | Date | Name | CPC Class | U.S. Class |
|---|---|---|---|---|
| 1,527,685 | February 1925 | Huwiler | F04C2/3446 | 418/261 |
| 1,686,767 | October 1928 | Saxon | F02B53/00 | 123/243 |
| 2,345,561 | April 1944 | Allen | F01C1/3446 | 418/264 |
| 2,590,729 | March 1952 | Scognamillo | F04C18/352 | 418/173 |
| 2,988,065 | June 1961 | Wankel | F02B53/04 | 123/242 |
| 3,468,260 | September 1969 | Belden | F04C2/3448 | 418/152 |
| 3,551,080 | December 1970 | Feller | F01C19/02 | 418/124 |
| 3.769,945 | November 1973 | Kahre | F01C1/3568 | 418/217 |
| 3,799,710 | March 1974 | Jacobs | F01C1/3448 | 418/147 |
| 3,865,521 | February 1975 | Upchurch | F01C19/08 | 418/121 |
| 3,873,253 | March 1975 | Eickmann | F01C21/0809 | 418/261 |
| 4,004,556 | January 1977 | Pfeiffer | F02B53/00 | 123/243 |
| 4,028,028 | June 1077 | Fuchs | F01C1/3448 | 418/219 |
| 4,325,394 | April 1982 | Reams | G03F7/30 | 134/141 |
| 4,401,070 | August 1983 | McCann | F01C1/3448 | 123/229 |
| 4,474,105 | October 1984 | Eicher | F15B15/12 | 92/122 |
| 4,573,892 | March 1986 | DuFrene | B62D13/00 | 418/219 |
| 4,575,324 | March 1986 | Sommer | F01C21/0809 | 418/217 |
| 4,667,468 | May 1987 | Hansen | F01C1/3441 | 123/248 |
| 4,799,867 | January 1989 | Sakamaki | F01C21/0836 | 418/1 |
| 5,429,084 | July 1995 | Cherry | F01C1/3448 | 123/243 |
| 5,509,793 | April 1996 | Cherry | F01C1/3448 | 123/243 |
| 5,524,587 | June 1996 | Mallen | F01C1/3446 | 123/202 |
| 5,551,853 | September 1996 | Cherry | F01C1/3448 | 418/137 |
| 5,634,783 | June 1997 | Beal | F01C21/3446 | 418/264 |
| 6,776,136 | August 2004 | Kazempour | F01C1/3446 | 123/243 |
| 7,707,987 | May 2010 | Guthrie | F01C1/3446 | 123/243 |
| 7,896,630 | March 2011 | Grisar | F01C1/3448 | 418/261 |

FOREIGN PATENT DOCUMENTS:

| Number | Date | Name | CPC Class |
|---|---|---|---|
| EP-0548416 | June 1993 | Gordon | F01C1/3448 |
| EP-1617040 | January 2006 | Badgley | F01C1/3448 |
| GB-1110162 | April 1968 | Eichmann | F01C19/10 |
| GB-1430196 | March 1976 | Mirkovic | F15B15/103 |
| GB-2419382 | April 2006 | See | F01C1/3441 |
| JP-55098689 | July 1980 | Kobayashi | F01C21/0881 |
| JP-02019601 | January 1990 | Hayashi | F01B003/00 |
| WO-8503736 | August 1985 | Hublet | F01C21/0881 |
| WO-0133082 | May 2001 | Tsutsui | F01C1/3446 |
| WO-2006018848 | February 2006 | Nagler | F01C1/3441 |

PARENT CASE TEXT

This invention relates to rotary machines and more particularly to rotary machines which can be constructed for operation as internal combustion engines, fluid pumps, air/gas expanders, and air/gas compressors. The present application is a continuation-in-part of my prior U.S. Pat. No. 7,896,630 filed Feb. 13, 2007 and awarded Mar. 1, 2011, which has expired.

FEDERALLY SPONSORED RESEARCH OR DEVELOPMENT

Not Applicable

REFERENCES—LISTINGS, TABLES, OR COMPUTER PROGRAMS

Not Applicable

BACKGROUND OF THE INVENTION

The present invention relates to a rotary device using radial reciprocating vanes whose position is controlled by a precision pin track.

Field of the Invention

Rotary devices have long been thought to be an efficient way of rotating a shaft in the case of a rotary engine, pumping a fluid in the case of a pump, and compressing a fluid in the case of a compressor. Rotary devices are generally characterized by a rotating "piston", or the equivalent, instead of a traditional linearly reciprocating piston as found in piston engines, pumps, and compressors. However, sealing the rotating "piston" has presented an extremely challenging problem, ultimately resulting in lack of widespread adoption of this technology. The sealing problems are particularly acute in a rotary engine as compared to a pump or a compressor. This is mainly because a combustion engine typically operates at higher pressures and temperatures, and therefore requires tighter sealing than in other applications. An inherent conflict in this technology is that tighter sealing may result in excessive friction and premature seal failure.

Many different approaches have been tried to address sealing issues with rotary devices including the elimination of seals altogether and reliance instead on close tolerances and accurate machining to seal leakage. Although in principle this approach can work for lower pressure and temperature applications, it is unsuitable for the higher temperatures and pressures of rotary engines where friction and thermal expansion are present. Ultimately the rotating "piston" will get hotter than the external casing. A "piston" that is a snug fit when the rotary engine has just been started will become tighter and tighter as it heats. A further complication is that unequal heating of the various parts will lead to non-uniform expansion of the parts, resulting in changes in shape as well as in size that make sealing attempts through tolerances and accurate machining unsuccessful in rotary engines.

Rotary engines have long been thought to be a viable replacement for the standard reciprocating piston engines. Rotary engines offer possible increases in mechanical and fuel efficiency, as well as more compact dimensions and a lower weight. The major deficiencies in traditional reciprocating piston engines arise from the short stroke of the pistons which leads to incomplete combustion. In theory, rotary engines provide a continuous power stroke with decreased structural complexity, due mostly to the reduction in the number of moving parts. In practice, however, rotary engines have not received widespread acceptance and have only had limited success in replacing reciprocating piston engines, due mainly to the complexities involved in building a "simpler" rotary engine. Specifically, rotary engines typically involve a complex-shaped combustion chamber which presents problems in sealing the combustion chamber. The inability to adequately seal the combustion chamber has lead to many failed prototypes of the rotary engine.

Description of the Related Art

One rotary engine that has received some commercial acceptance is the Wankel engine, original U.S. Pat. No. 2,988,065, which has been used in some models of automobiles produced by Mazda. A Wankel engine has a triangular shaped rotor, i.e., a rotating "piston" incorporating a central ring gear which is driven around a fixed pinion within an oval shaped housing. The triangular shaped rotor creates three combustion chambers between the rotor and the interior walls of the housing as the rotor turns within the housing. Each of the three rotating combustion chambers dynamically changes in volume as the triangular rotor rotates in the oblong housing and undergoes the four stages of the Otto cycle—intake, compression, ignition and exhaustion. The rotary motion is transferred to the drive shaft via an eccentric wheel that rides in a bearing in the rotor that matches the central ring gear. The drive shaft rotates once during every power stroke instead of twice as in a typical four stroke reciprocating piston engine. The Wankel engine promised higher power output with fewer moving parts than the Otto cycle reciprocating piston engine, however, technical difficulties associated with sealing the three rotating combustion chambers have apparently interfered with widespread adoption.

Another type of rotary engine is known as the axial vane rotary engine. In an axial vane rotary engine, a circular rotor is located between two cams, each cam having a cooperating undulating cam surface facing the rotor. The rotor has a series of angularly spaced slots to receive axially sliding vanes whose ends contact each of the opposing undulating cam surfaces so that combustion chambers are dynamically formed between adjacent axially sliding vanes. Axial vane rotary engines are described in U.S. Pat. Nos. 4,401,070, 5,429,084, 5,509,793 5,551,853, and 7,896,630; all of which are herein incorporated by reference.

An axial vane rotary engine has the capacity to provide greater output than a Wankel rotary engine of the same size. However, an axial vane rotary engine presents a greater sealing challenge since the vanes slide both axially with respect to the rotor and circumferentially with respect to the cam surfaces. The present invention is directed to a rotary device of improved design over the prior art which eliminates the complex circular and axial motion of axial vanes, and facilitates the ability to adequately seal the combustion chambers formed between adjacent vanes.

The Circle-Ellipse Engine leverages the work accomplished by Mazda in sealing the combustion chamber of its Wankel engine design. Further, it leverages the contributions by Cherry (U.S. Pat Nos. 5,429,084, 5,509,793, and 5,551,853), in promulgating the pioneer work by McCann (U.S. Pat. No. 4,401,070), in the opposing cam axial-vane rotary engine.

The Innovation

This device eliminates the complex and expensive machining associated with the epitrochoid housing and triangular central rotor of the Mazda-Wankel implementation (U.S. Pat. No. 2,988,065).

Instead, this device integrates a geometrically standard ellipse as the cam surface, and integrates a circular rotor facing the cam surface. The innovation is the pin track in the end plates. This track serves to accurately position the tip of the vane a fixed distance from the cam surface for all angles of rotation of the rotor. Now managed with constant distance, the small gap is effectively sealed by an Apex Seal identical to that of the Mazda-Wankel implementation.

Prior attempts at implementing a pin track failed. They were based on following the geometry of the cam. This was a mistake, and resulted in a varying solution of the distance from the vane tip to the cam surface.

The correct implementation in this innovation is a pin track derived from the three contributing elements; namely the cam surface (an ellipse), the rotor (a circle), and the host end plates (fixed location). The solution is a complex transcendental equation that properly integrates the geometry of the three independent components.

It is understood that one of skill in the art of rotary devices can apply the principles discussed herein in the various embodiments equally to other rotary devices such as pumps, compressors, expanders, etc.

BRIEF DESCRIPTION OF DRAWINGS

The invention will be more readily understood from the following description of a preferred embodiment thereof given.

DETAILED DESCRIPTION OF THE INVENTION

A circle-ellipse engine comprises a stationary circular outer housing having an inner elliptical cam surface, and a separate internal round rotor partitioned into equal segments that are populated by a quantity identical movable radial vanes. During rotation, the end of the vanes are positioned a constant distance from the elliptical inner cam surface of the housing. The internal round rotor has the same radius as the minor axis of the elliptical inner cam surface, less a small amount of designed clearance, which is completed by dynamic position of a spring loaded apex seal (not part of this invention). During rotation, a variable height cavity is created representing the difference between the item 455 elliptical cam inner surface and the item 305 rotor face combustion pocket.

The position of the radial vanes is guided by the slots in the symmetrical rotor, extending to the elliptical inner cam surface of the housing. The precise extension is governed by a pin track machined into the dual end plates.

There are no pistons, camshaft, timing chains, valves, valve lifters, rocker arms, connecting rods, or wrist pins. As a benefit, size and weight are significantly reduced when compared to a reciprocating engine of similar horsepower. Normal aspirated air is continuously drawn into the engine when an adjacent pair of radial vanes passes the air inlet port. Similarly, exhaust products are expelled after a combustion event when the pair of adjacent vanes passes over the exhaust port.

The resultant geometer results in a continuous implementation of the Otto Cycle; namely intake, compression, expansion or power stroke, and exhaust during a single rotation of the internal rotor.

Because the Otto Cycle is executed each revolution of the rotor, the circle-ellipse engine achieves the same power as a conventional reciprocating engine of the same displacement and compression ratio, at half the RPM. This implementation greatly reduces component ware and extends the life and maintenance cycle by a factor of four. As a side benefit, the power losses and vibration common to all reciprocating engines are minimized.

DESCRIPTION OF THE PREFERRED EMBODIMENTS

The present invention is directed to a circle-ellipse engine, hereinafter referred to as a the device, capable of various implementations such as an engine, a pump, a compressor, or an expander, each having the following general features: (a) first and second chamber paths allowing for a plurality of chambers to be formed between adjacent vanes; (b) the housing cam surface and rotor form parts of the chamber, and the vanes driven off a pin track on each end plate; and (c) the volume of each of the chambers dynamically changes as the as the rotor turns with respect to the housing's cam surface. The ability to rapidly change the volume of the chambers, and eliminate leakage between the chambers and other cavities, is crucial to the successful implementation of the device.

Figure 1:
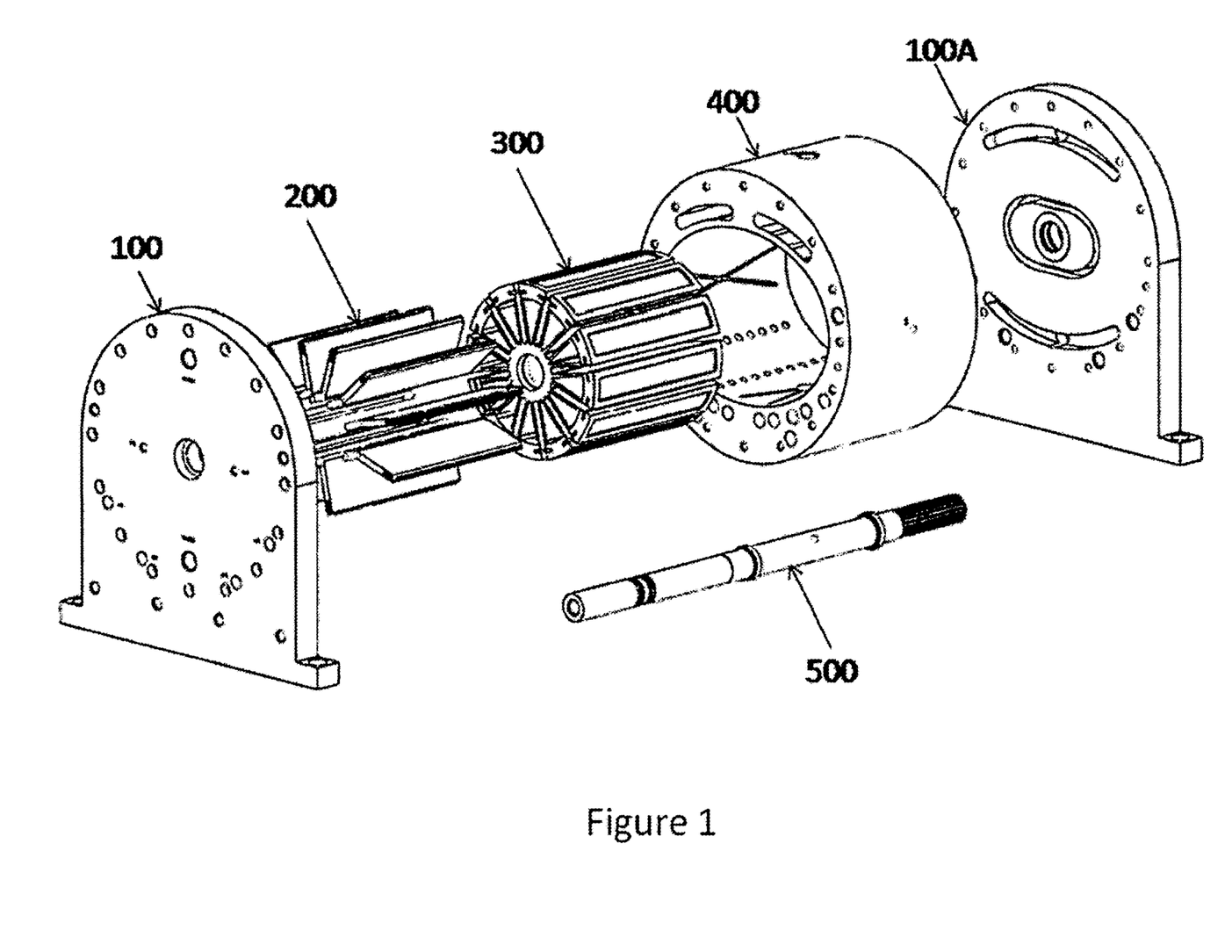
FIG. 1 is a simplified exploded, isometric view showing a circle-ellipse engine of the invention.

Referring to the figures and first to FIG. 1, there is shown a device comprised of two identical and opposing end plates, respectively items 100 and 100A, separated by item 400 housing. The housing encloses the item 300 rotor, and a plurality of identical item 200 vanes. Completing the device is the item 500 drive shaft, which is a line-to-line fit with the item 300 rotor.

Figure 2:
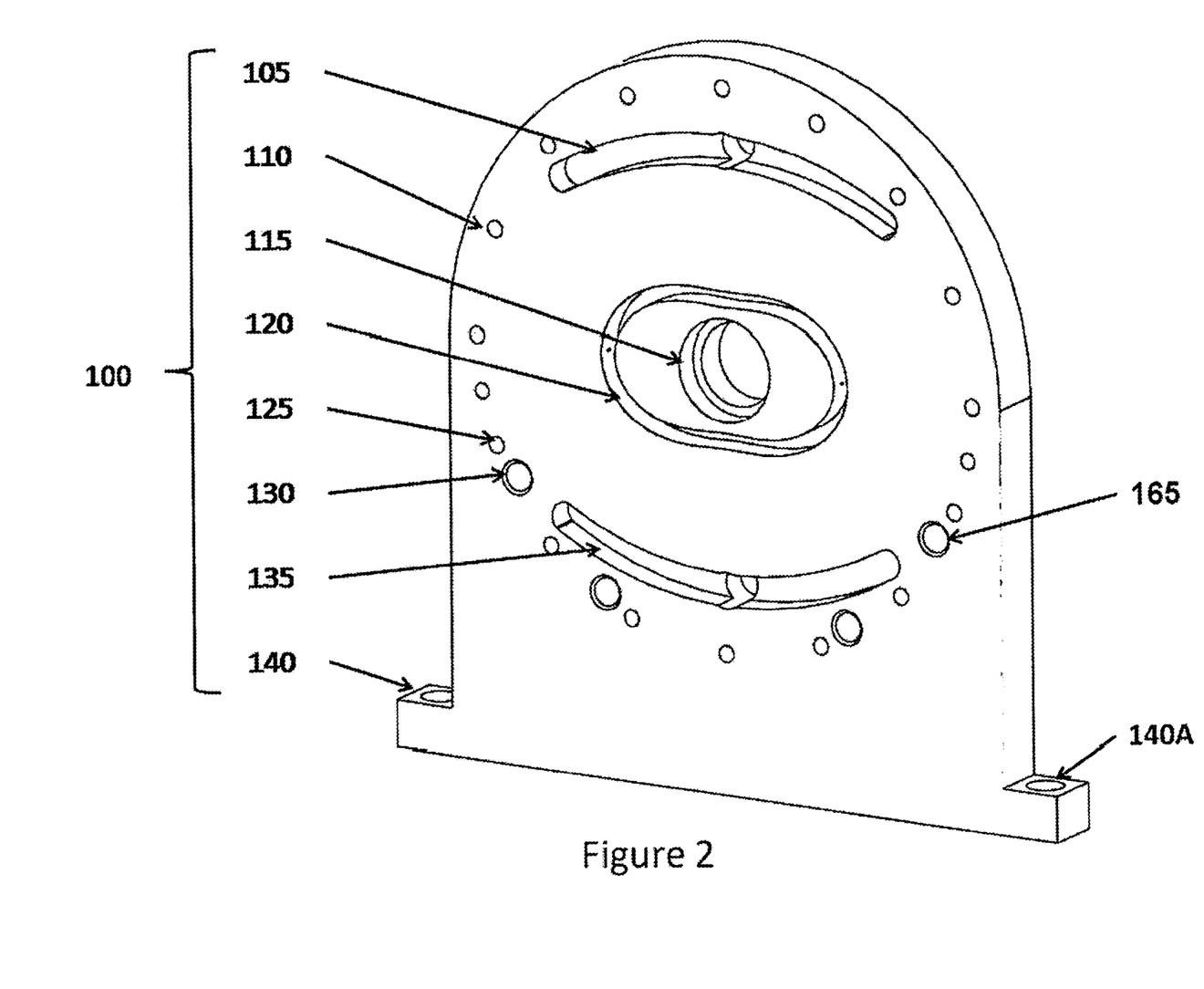
FIG. 2 is an isometric view showing the inside of the end plate member of the circle-ellipse engine of the invention.
Figure 3:
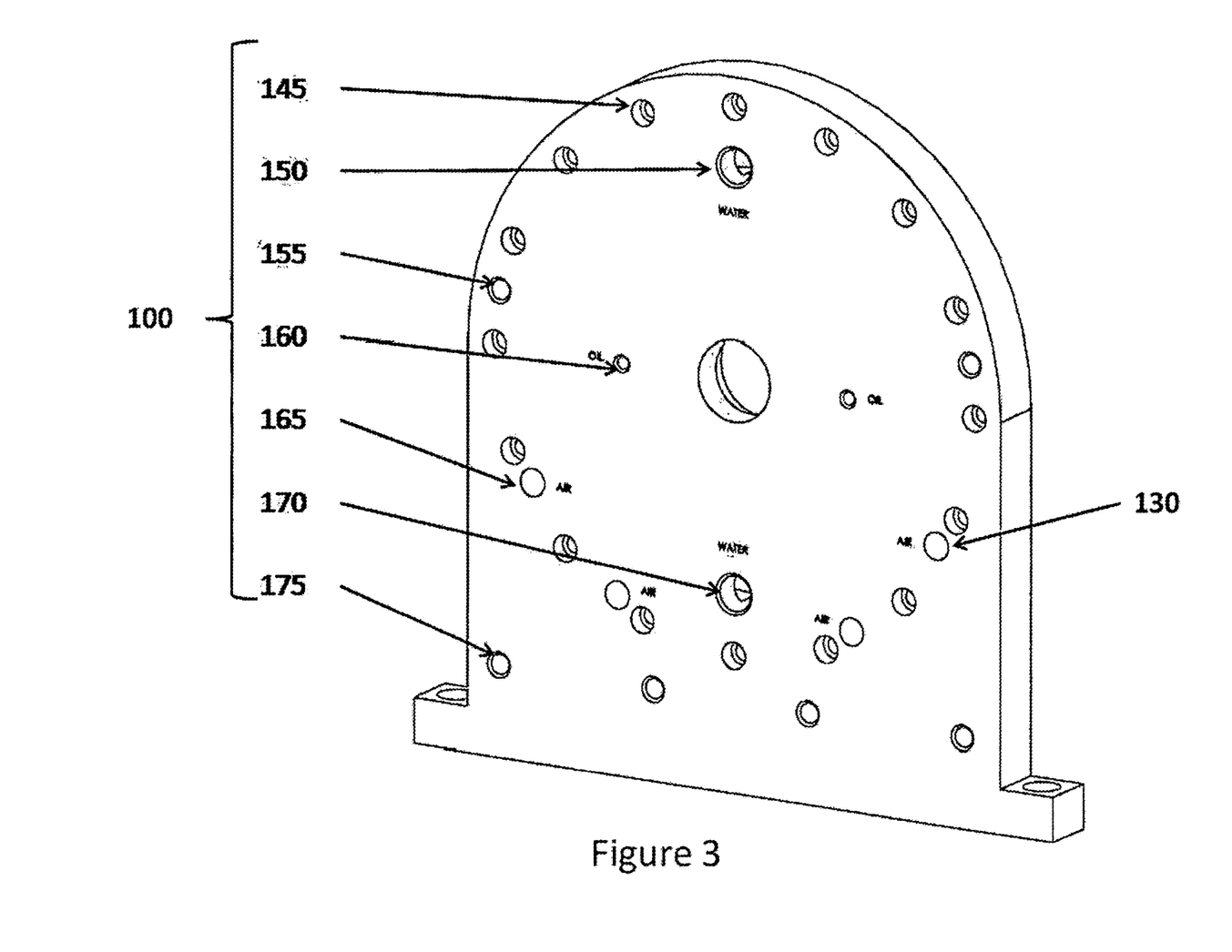
FIG. 3 is an isometric view showing the outside of the end plate member of the circle-ellipse engine of the invention.

Please refer next to FIG. 2 and FIG. 3, which are respectively the inside and outside of the identical end plates, respectively items 100 and 100A. Items 130 and 165 are repeated on FIGS. 2 and 3 to show the connectively relationship between the front and back sides.

Two identical water plenums, in the end plate, respectively upper 105 and lower 135, provide for passage of cooling water from the external water fitting locations, respectively upper 150 and lower 170, into the circle-ellipse engine. The cooling water is then directed to appropriate water passageways in the item 400 housing to provide thermal stability. Cooling water enters through item 150, an external water inlet port. The cooling water fills item 105 upper water plenum on the same item 100 end plate. Cooling water is passed through housing item 415 cooling water passageway, which passes on each side by the top of the rotor item 305 combustion chamber. Now warmed by absorbing elevated combustion heat, cooling water next passes to item 105 water plenum on the opposite item 100 end plate.

The warmed cooling water is looped by an external hose (not part of this device). The hose is next connected to the lower item 170 water inlet port on the same item 100 end plate. As described above, the warmed cooling water passes to the item 105 water plenum, then the item 450 water channels in the item 400 housing, next to the lower item 135 water plenum, expelled to the item 170 water fitting, and lastly connected to an external filter, radiator, and water pump (which are not part of this device).

Item 415 cooling water passageway has a large surface area. This helps to maximize heat transfer from the item 400 housing to the cooling water. The item 300 rotor and item 200 vanes are oil cooled, and will be described shortly.

Items 110 and 145 are the inside and outside locations for one of the 16 socket head screws to fasten the end plates 100 and 100A to each end of the item 400 housing.

Item 115 is a cavity suitable for securely mounting thrust and roller bearings respectively in each end plate 100 and 100A. By mounting the bearings on the inside of the end plates, secure mounting is assured. This innovation compensates for internal thermal expansion of the device, based on a similar implementation in gas turbine engines.

Figure 9:
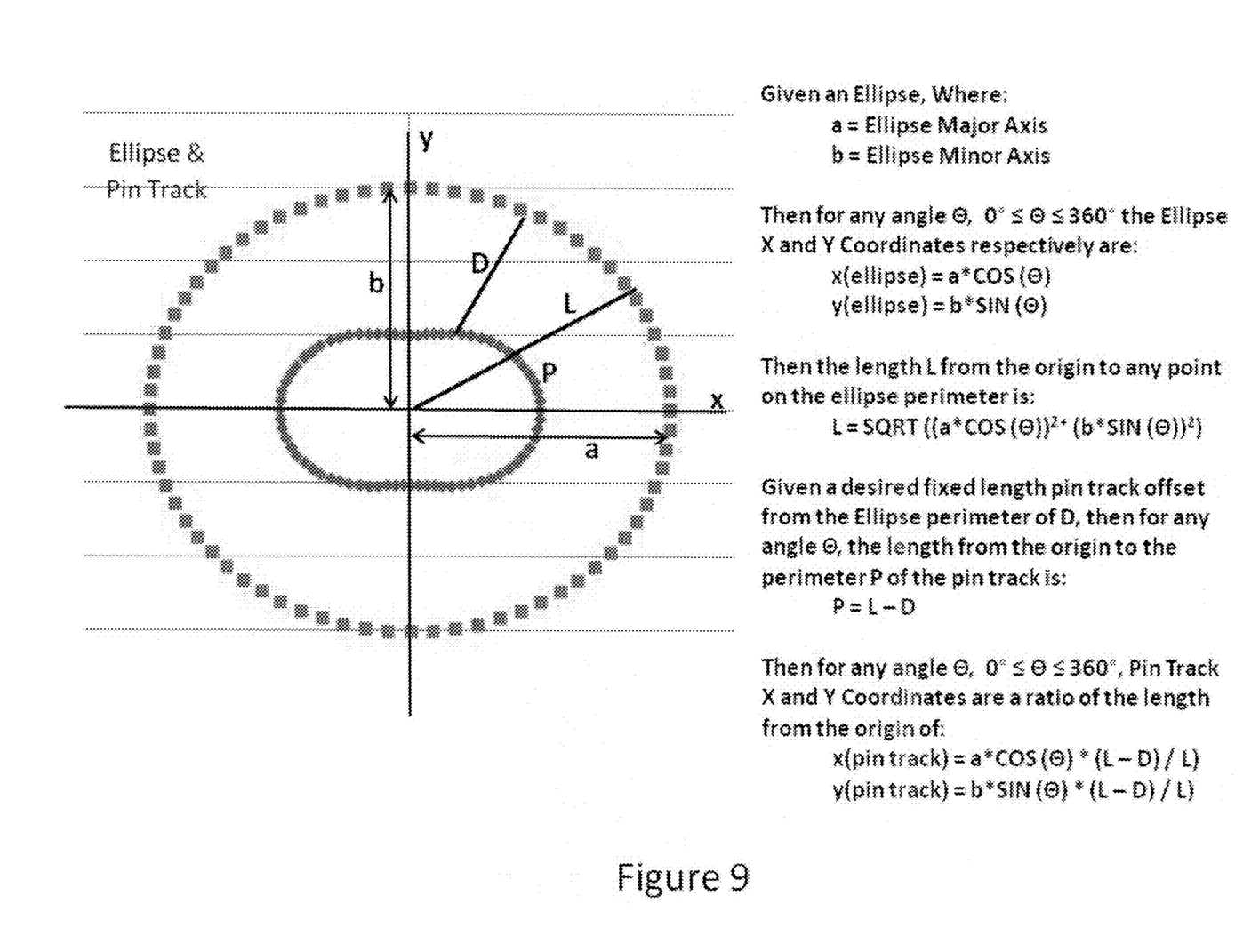
FIG. 9 is a graphic explanation of the interrelationships between the pin track of the end plate, the tip of the vane, and the inner elliptical surface of the housing of the circle-ellipse engine of the invention.

Item 120 is a pin track. It is a calculated path based on complex transcendental mathematics as shown in FIG. 9. It serves to precisely position the vanes tips such that they are maintained a constant distance from the item 455 inner cam surface of the item 400 housing, for all angular positions of the item 300 rotor.

Item 125 is one of two locations for accurately positioning a hard pin. The two pins serve to precisely locate the end plates with regards to the housing, ensuring proper alignment during assembly.

Items 130 and 165 are the inside and outside locations for one of four identical air inlet/exhaust fittings. These convey passage of air/exhaust to/ from the inside of the item 455 elliptical cam surface of the item 400 housing.

Two mounting holes items 140 and 140A are provided for securing the device to a suitable base.

Items 155 and 175 are two of the identical six pre-threaded hard points for attaching accessories, such as an alternator, water pump, oil pump, and/or power steering pump as needed. These accessories are not part of the device.

Two item 160 pre-threaded lubrication ports are provided for attaching flow restrictors. The flow restrictors have a 0.060-inch diameter aperture to provide a specific amount of lubrication oil. Pin track lubrication is required for item 215 pin of item 200 vane, as it navigates around the item 120 pin track of item 100 and 100A end plates. Without sufficient lubrication, the item 215 pins of item 200 vanes could bind in the item 120 pin tracks of the identical item 100 and 100A end plates Conversely too much lubrication oil could overflow the item 120 pin track and cause undesirable entry of lubrication oil into item 305 combustion chamber of item 300 rotor.

Figure 4:
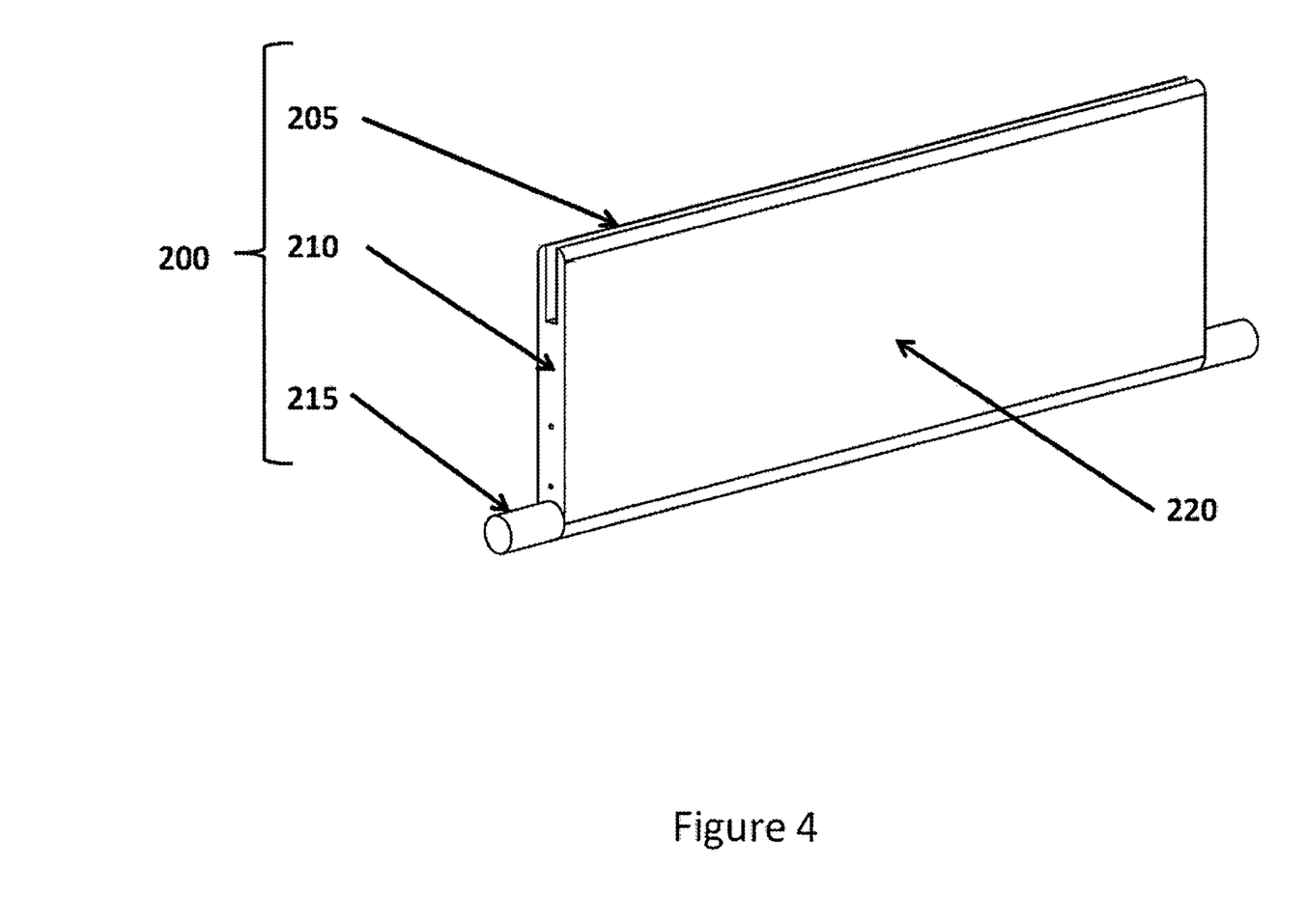
FIG. 4 is an isometric view showing a radial vane of the circle-ellipse engine of the invention.

Please refer next to FIG. 4, which is the radial vane, item 200. A plurality of vanes are inserted into item 315 vane slots. These partition the item 300 rotor into separate chambers suitable for combustion events.

Item 205 provides a location slot for mounting the apex seal. The apex seal (not part of this invention) transverses the precisely defined distance from the tip of the item 205 vane slot to item 455 elliptical cam surface.

Item 210 is one of many internal lubrication ports, which guide lubrication oil from the source, item 330 lubrication ports of item 300 rotor, to each external surface of the Item 200 vane. These pre-drilled ports provide for a precise and minimal amount of oil to lubricate the vane interface with the end plates, respectively 100 and 100A, the item 315 vane slots, and the item 205 apex seal slot, and item 310 face seal cavity.

Without sufficient lubrication, item 200 vanes could bind in the item 315 vane slots of item 300 rotor. Conversely too much lubrication oil entering from item 325 rotor lubrication ports or item 210 vane lubrication ports could overflow the item 315 vane slot and cause undesirable entry of lubrication oil into item 305 combustion chamber of item 300 rotor.

Item 215 is the pin that interfaces respectively with the pin tracks in end plates 100 and 100A. The pin serves to precisely control the position of the vane 200 based on its instantaneous position of the item 300 rotor.

Item 220 is the face of the vane that interfaces with item 315 vane slots in item 300 rotors. This face receives lubrication oil from item 330 oil passageways in the rotor.

Figure 5:
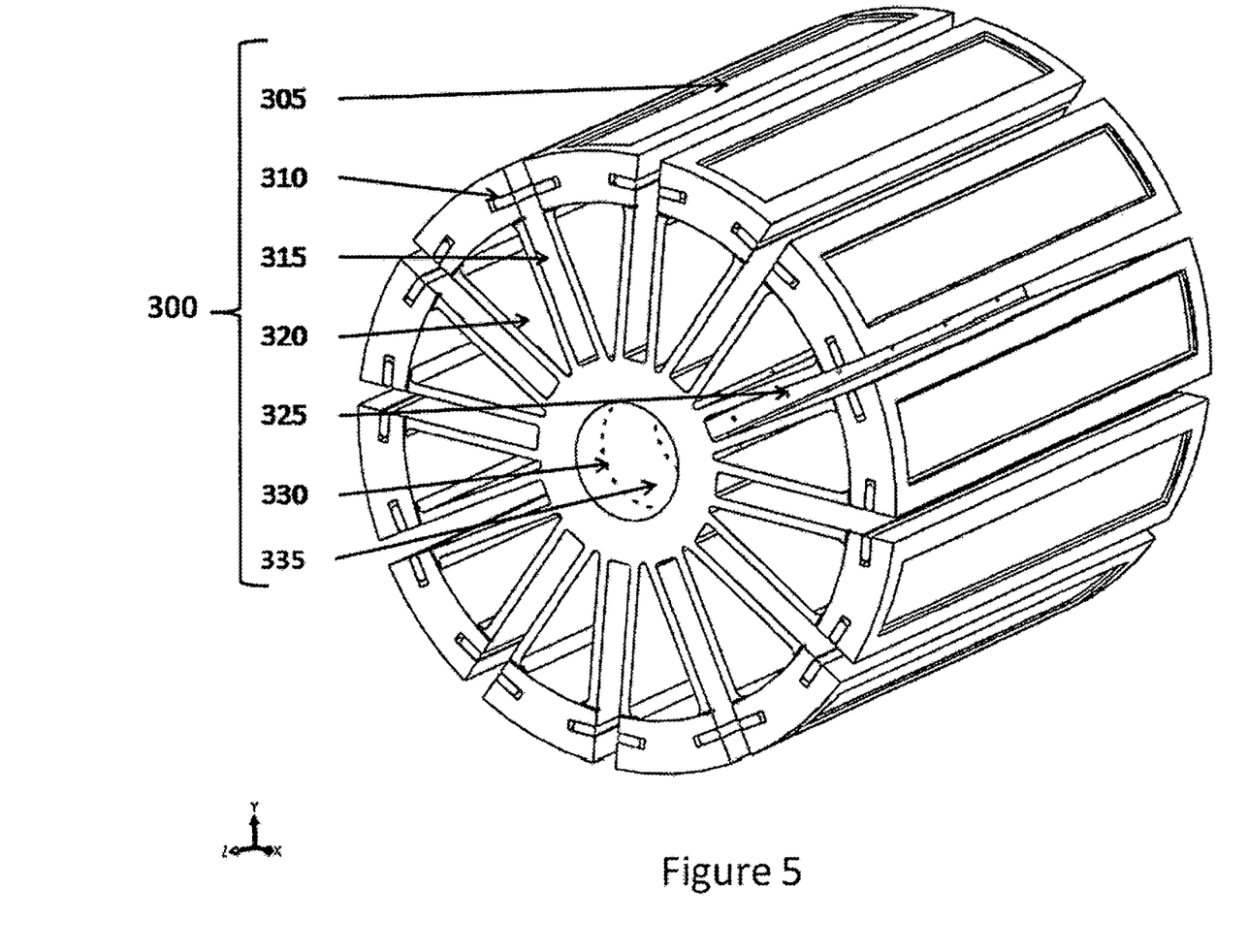
FIG. 5 is an isometric view showing a rotor of the circle-ellipse engine of the invention.

Please refer next to FIG. 5, which is the item 300 rotor. The rotor is the major moving component of the device. It is partitioned into a plurality of identical segments, each of which independently forms a part of the combustion chambers.

Item 305 is one of a plurality of identical combustion surfaces. During rotation, when this rotor surface is closest to the item 455 elliptical cam surface of the item 400 housing, there is maximum compression. At this point there is minimum extension of a pair of adjacent item 200 vanes.

Item 310 is one of a plurality of identical side seal slots. When populated with side seals, these slots ensure positive and low friction sealing of the radial vanes in the combustion chamber. This prevents the leakage of combustion products into lubrication oil, contaminating the oil, and leakage of unwanted oil into the combustion chamber to help minimize Nitrogen-Oxygen (NOx) pollutants.

Item 315 is one of a plurality of identical vane slots. When populated with item 200 vanes, these slots ensure positive and low friction radial motion of the vanes. The slots are sealed on both ends respectively by end plates 100 and 100A.

Item 320 is one of identical lubrication oil chambers. These provide appropriate amounts of lubricating oil and thermal cooling to each vane slot and the item 300 rotor that interfaces with both end plates, respectively items 100 and 100A.

Item 325 is one of many identical lubrication ports, 12 per each vane slot), that provide lubrication oil to each of the identical lubrication oil chambers 320, and each of the item 315 vane slots. Each of the chambers and slots contain six entry ports, which provide even distribution of lubrication oil throughout the device. The item 325 lubrication ports are pre-drilled to 0.060-inch diameter and provide for a precise and minimal amount of oil to lubricate the vane interface.

Item 330 is the location of one of the lubrication ports connecting to the opposite end of the item 325 lubrication ports. In conjunction with item 500 drive shaft, these ports are the exit locations of the rotor manifold, which is fed from the hollow item 500 drive shaft.

Figure 6:
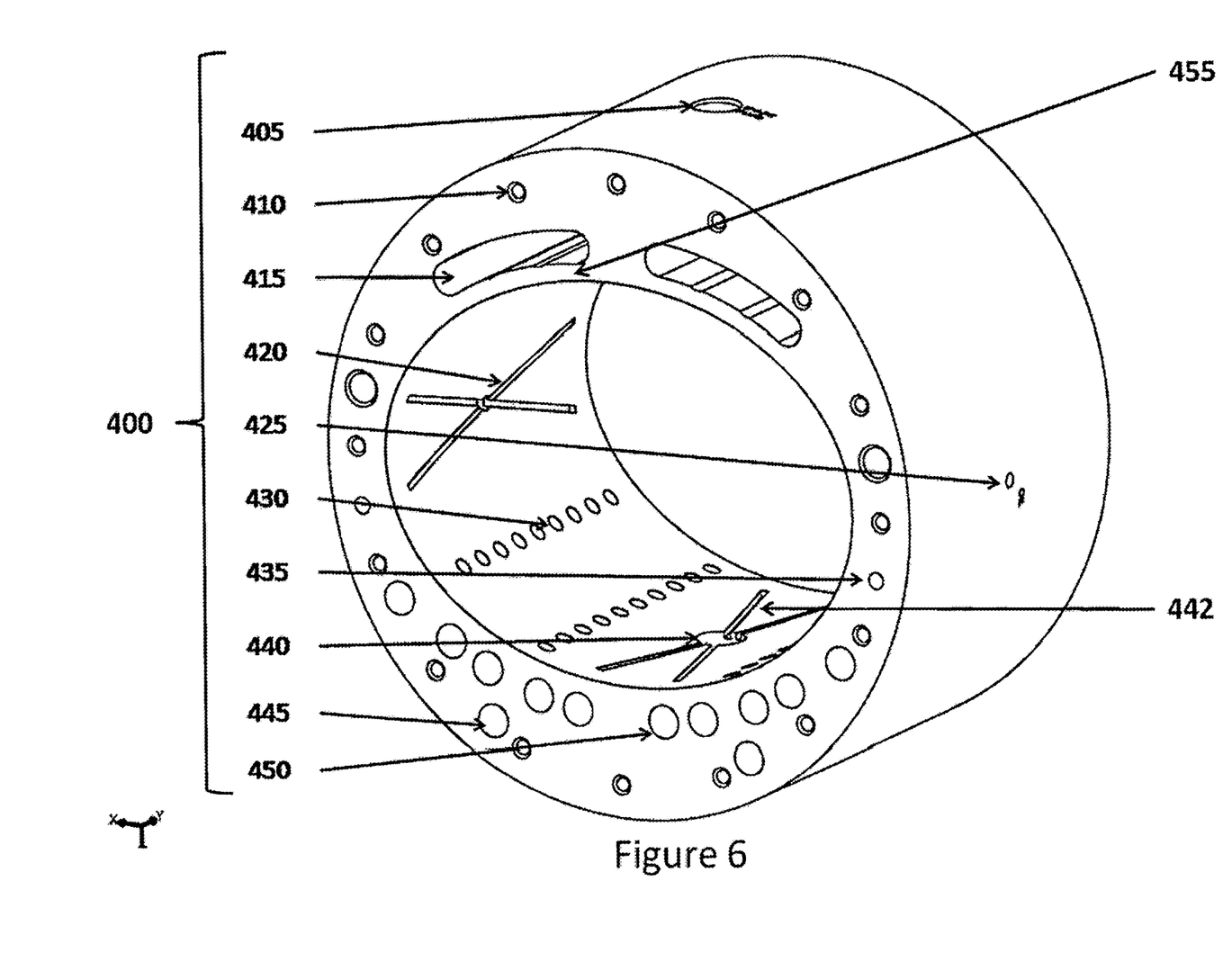
FIG. 6 is an isometric view showing a housing of the circle-ellipse engine of the invention.

Please refer next to FIG. 6, which is the item 400 housing. The housing is the major static, non-moving component of the device. It accommodates passageways for cooling water, natural aspirated air, exhaust products, and distribution lubrication/cooling oil.

Item 405 is the spark plug port. For a compression ignition engine implementation of this device, it is the location of the fuel injector.

Item 410 is one of 16 identical threaded holes to accommodate socket head mounting screws that secure the end plates 100 and 100A to the housing.

Item 415 is a cooling water passageway. It is a direct interface to the water source port, end plate Item 150, which in turn supplies the upper end plate water distribution manifold Item 105. The extensive size of the passageway is to provide thermal stability to the item 400 housing.

Item 420 is one of two identical internal lubrication oil distribution tracks that lubricate the working surface of the apex seals from item 205 vane slot of item 200 vane.

Item 425 is one of two identical external ports for the attachment of oil flow restrictors, which in turn feel lubrication oil to oil distribution tracks Item 420. The flow restrictors have a 0.060-inch diameter aperture to provide a limited and specific amount of lubrication oil. The flow restrictors ensure proper oil lubrication is applied to the apex seals, (not part of this invention) which are mounted in item 205 apex seal slots. These lubricate the interface between the apex seals and the inner cam surface of the housing item 455, and minimize the amount of unwanted oil into the combustion chamber which minimizes formation of Nitrogen-Oxygen (NOx) pollutants.

Item 430 is one of 36 air/exhaust ports that connect air/exhaust from the end plates items 130 and 165, through housing Item 445 and into the inside elliptical cam surface of the housing item 455. The ports are arranged in four segments of nine openings each. This is to minimize the disruption and wear on the apex seals, ensure even distribution, and define the proper distanced between an adjacent pair of item 200 vanes.

Item 435 is one of two locations for accurately positioning a hard pin. The two pins serve to precisely locate the item 125 end plates with regards to the housing, ensuring proper alignment during assembly.

Item 440 is the lubrication oil exit port. The lubrication oil that enters each of the Item 425 ports is swept into the internal lubrication oil scavenge track and drained into the oil sump, which is not part of the device. Scavenged oil foam is removed by baffles in the sump, before it is respectively conveyed to an oil filter and pump. The lubrication oil that enters each of the item 425 ports is swept into the four internal lubrication oil item 442 scavenge tracks and drained into the item 440 is the lubrication oil exit port.

Item 445 is the mating location for each of the four identical air/exhaust ports to/from the end plate Items 130 and 165. These convey passage of air/exhaust to/from the inside of the elliptical cam surface of item 430 housing.

Item 450 is one of eight identical cooling water passageways. It is a direct interface to the water source port, end plate Item 135 which in turn feeds lower end plate water distribution manifold Item 135. The extensive size of the passageway is to provide thermal stability to the item 400 housing.

Item 455 is the inside elliptical cam surface of the item 400 housing. The geometry is an ellipse with a major and minor axis. This simple cam surface supersedes all complex, prior attempts to satisfy the requirement for a continuously changing height of the combustion chamber. Prior efforts included complex sinusoidal implementations, which were characterized by high acceleration ramp changes. Unfortunately, these resulted in intensive wear patterns, including chatter, gouging, and ripple effects on the ramp. Complex lubrication was requiring for these implementations, resulting in residual oil in the combustion chamber which lead to excessive nitrogen-oxygen (NOx) products.

Figure 7:
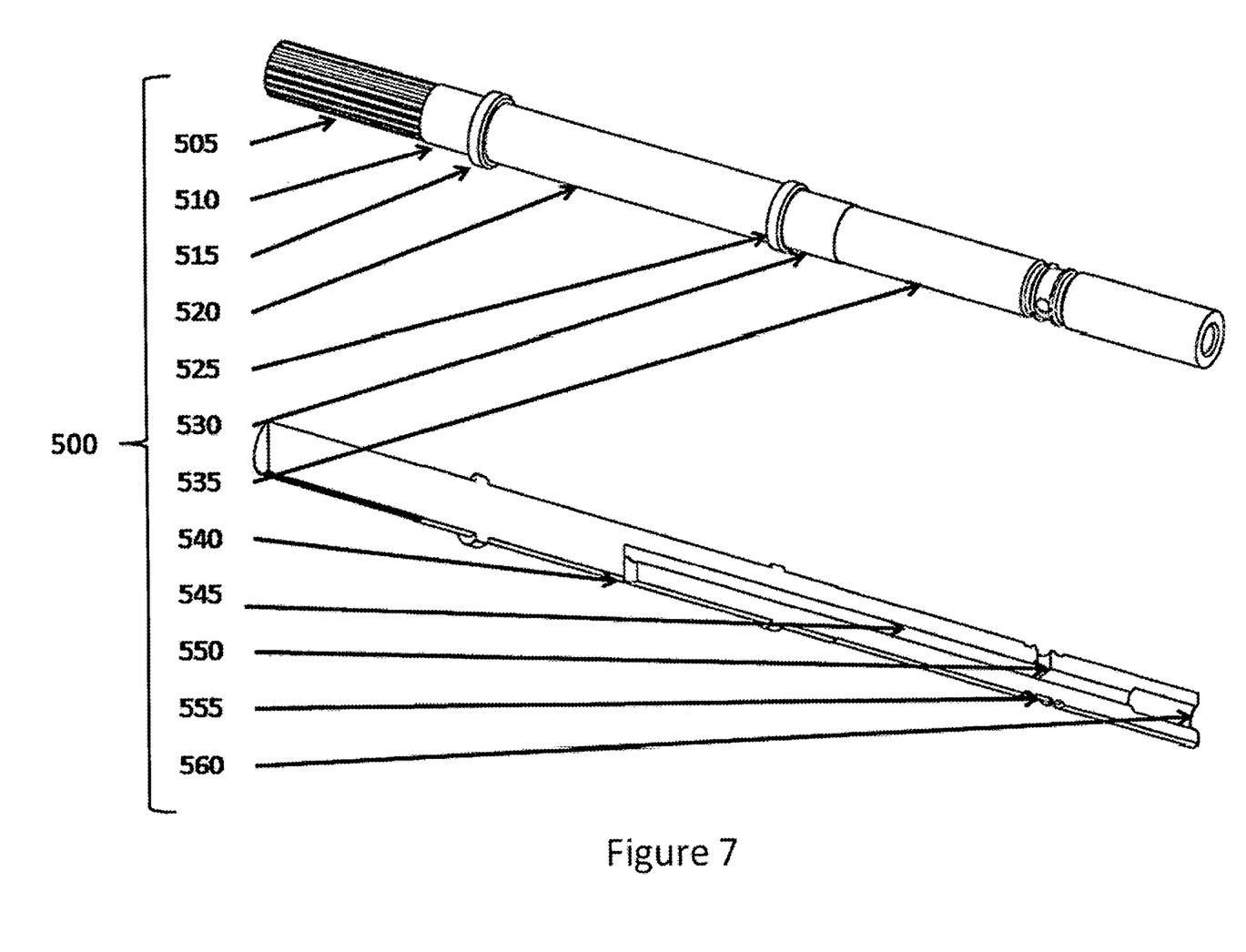
FIG. 7 is a composite isometric view showing external and internal features of the drive shaft of the circle-ellipse engine of the invention.

Please refer next to FIG. 7, which is the item 500 drive shaft. The drive shaft is the component of the device that couples all generated power to the load. It integrates an internal passageway that provides cooling and lubrication oil to all rotary components. Because its function is novel, two views, external and cut-away, are provided, to help understand the description.

Item 505 is a spline section of the drive shaft. It has a standard 16 rib spline compatible with many devices such as transmissions and gear boxes.

Items 510 and 530 serve an identical purpose. They provide a line-to-line press-fit interface for the bearings, which are housed inside the end plates in a cavity Item 115.

Items 515 and 525 provide a line-to-line press-fit interface for the item 300 rotor. This section between the two collars has a slightly reduced diameter and forms the opposite ends of an oil manifold.

Item 520 is the oil manifold. It provides symmetrical distribution of cooling and lubricating oil to the item 300 rotor through 144 ports discussed earlier as rotor Item 325.

Item 535 is a section of the drive shaft that supports the attachment of a commercial rotary union. The rotary union facilitates connection of cooling and lubricating oil to the rotating drive shaft.

Items 540, 545, and 550 are shown in the cut-away view of the item 500 drive shaft and are interrelated to the injection and distribution of cooling and lubricating oil. Item 550 is the inlet port, which is mated with the commercial rotary union discussed in the prior paragraph. Item 545 is the internal passageway that connects the inlet to outlet port 540. The outlet port is located in the center of the item 300 rotor manifold, and distributes oil to the 144 ports of the rotor, Item 330.

Item 555 are groves in the drive shaft that provide the structure for installation of O-rings to seal the sides of the commercial rotary union to the drive shaft and eliminate oil leakage.

Item 560 is a threaded hole for an end cap. In order to machine the internal passageway Item 545 in the drive shaft, an access means is required. After machining, a commercial screw cap is used to seal the opening.

Figure 8:
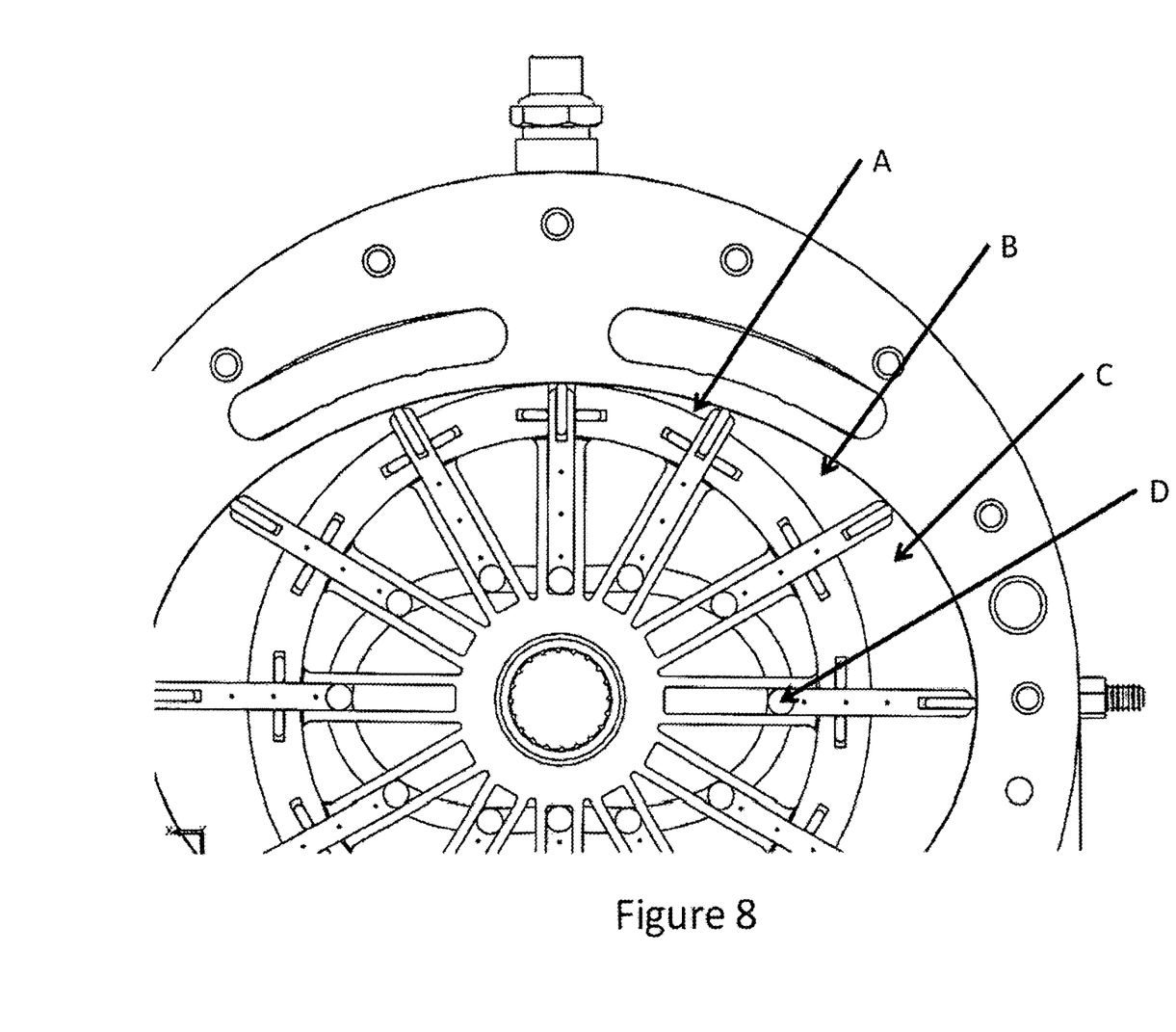
FIG. 8 is a cross-section view showing a combustion chamber of the circle-ellipse engine of the invention

Please refer next to FIG. 8, which is a cross-section view of the assembled device, with one section (quadrant) highlighted.

The six-sided chambers are formed by the inner cam surface of item 400 housing, item 300 rotor, a pair of adjacent item 200 vanes, and (not shown) end plates 100 and 100A.

As the item 300 rotor turns clockwise, the combustion chamber pointed by Index A is a very small, expanding chamber which is manifest when the item 300 passes the top-center of the inner cam surface, just past the top of elliptical minor axis.

As the rotor continues to turn clockwise, the chamber expands, as shown by Index B.

The maximum chamber height, as shown by Index C, occurs when rotor reaches a horizontal position of the inner cam surface, which is the elliptical major axis.

As the rotor continues to turn clockwise, the cycle repeats these steps in reverse sequence.

Index D is a related feature. It is pointing to vane pin 215. This pin is assembled into pin track 120 of end plates 100 and 100A. It is this pin track that determines the position of radial vane 200, and its extension beyond the perimeter surface of item 300 Rotor.

Please refer next to FIG. 9, which is shows the relationship of the pin track, shown as its perimeter P, and the cam surface of item 455 housing, Prior implementations, notably U.S. Pat. No. 7,896,630, implemented a simple offset of the vane tip from the cam surface. This earlier implementation created a variable distance which made sealing very challenging.

It will be understood by a person skilled in the art that although the device shown in FIGS. 1 through 9 is a circle-ellipse engine, the device can be implemented in other embodiments including a pump, a compressor and an expander.

While preferred embodiments of the present invention have been described, it is to be understood that the embodiments are illustrative only and the scope of the invention is to be defined solely by the appended claims when accorded a full range of equivalence, many variations and modifications naturally occurring to those of skill in the art from a perusal hereof. As is readily, apparent the system and method of the present invention is advantageous in several aspects.

What is claimed is:

1. A circle-ellipse engine comprising:
an identical pair of end plates, assuring exact placement of the vane tip for all rotation angles;
wherein said end plates have an internal pin track;
wherein said end plates incorporate provisions for accepting aspirated intake air;
wherein said end plates incorporate provisions for exhausting combustion product gases; and
wherein said end plates incorporate an internal race to accept either a thrust bearing or a roller bearing on the inside race of each of the identical pair of said end plates;
a plurality of vanes, each including apex seal slots: a plurality of spring-loaded apex seals to close the gap between the vane tip and the inner elliptical cam surface of the housing;
a rotor, including combustion chambers and face seal cavities;
a plurality of spring-loaded face seals prevent leakage of the exhaust gas and of unwanted lubrication oil into said combustion chamber;
a drive shaft including an internal passageway for supplying cooling and lubrication oil;
inlet ports for aspirating air into said housing;
exhaust ports for expelling exhaust gas out of said a housing containing passageways; and
dual pin tracks;
wherein the plurality of said vanes are positioned in relationship to an inner elliptical cam surface of the housing by said dual pin tracks;
wherein said dual pin tracks integrates said rotor, the plurality of said vanes and said housing to assure a displacement of a tip of the plurality of said vanes in all rotation angles; and
wherein the lubrication oil is delivered to said dual pin tracks via lubrication oil ports attaching to flow restrictors.

2. The circle-ellipse engine of claim 1,
wherein said housing includes an inner elliptical cam surface and provides feed through provisions for all fluids and gases;
wherein the lubrication oil ports on said end plates align with lubrication oil passageways in said housing for all the rotating and oscillating parts;
wherein the air intake ports on said end plates align with air passageways in said housing to supply the combustion chambers;

wherein the water intake ports on said end plates align with water passageways in said housing to provide thermal stability; and wherein the exhaust ports in said end plates align with exhaust passageways in said housing to facilitate removal of combustion gases; and further including internal lubrication oil distribution tracks for lubricating and for recovering excess lubrication oil during each complete revolution of the said rotor.

3. The circle-ellipse engine of claim 1, wherein said rotor further includes:

a radius being equal to that of the minor axis of the inner elliptical cam surface of said housing, and partitioned into equal and symmetrical segments interspersed by radial movement the plurality of said vanes to from combustion surfaces;

an internal hub of the said rotor having a cooling and lubrication oil manifold to reduce friction of said rotor, the plurality of said vanes and said drive shaft;

a plurality of face seal slots, each of the plurality of said face seal slots has internal passageways to facilitate movement of lubrication oil;

a plurality of oil chambers to insure continuous lubrication oil flow; and a pair of internal oil manifolds to insure lubrication oil is contained within the center hub of the said rotor; and a plurality of hemispherical pockets to optimize the location and timing of sequential and continuous combustion events.

* * * * *